US008499744B2

(12) United States Patent
Fujikawa

(10) Patent No.: US 8,499,744 B2
(45) Date of Patent: Aug. 6, 2013

(54) ACCELERATOR OPENING DEGREE ESTIMATION AND ENGINE SOUND GENERATION

(75) Inventor: Naoki Fujikawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 592 days.

(21) Appl. No.: 12/826,505

(22) Filed: Jun. 29, 2010

(65) Prior Publication Data

US 2010/0326402 A1 Dec. 30, 2010

(30) Foreign Application Priority Data

Jun. 30, 2009 (JP) ................................ 2009-156031

(51) Int. Cl.
*F02D 11/10* (2006.01)
*B60R 11/02* (2006.01)
*G10K 15/04* (2006.01)

(52) U.S. Cl.
USPC ............................................ 123/399; 701/70

(58) Field of Classification Search
USPC ................ 123/399, 361; 701/36, 70; 74/512, 74/513
See application file for complete search history.

(56) References Cited

U.S. PATENT DOCUMENTS

| | | | | |
|---|---|---|---|---|
| 4,693,332 | A * | 9/1987 | Miyata et al. | 180/422 |
| 5,635,903 | A | 6/1997 | Koike et al. | |
| 6,981,486 | B2 * | 1/2006 | Yone et al. | 123/399 |
| 2005/0056253 | A1 | 3/2005 | Yone et al. | |
| 2011/0085674 | A1 * | 4/2011 | Fujikawa | 381/86 |

FOREIGN PATENT DOCUMENTS

| | | |
|---|---|---|
| JP | 2000-001142 A | 1/2000 |
| JP | 2000-010576 A | 1/2000 |
| JP | 2001-287571 A | 10/2001 |
| JP | 2003-214990 A | 7/2003 |
| JP | 2005-090347 | 4/2005 |
| JP | 2006-069487 | 3/2006 |
| JP | 2006-321364 A | 11/2006 |

OTHER PUBLICATIONS

European Search Report mailed Sep. 17, 2010, for EP Application No. 10166741.8, five pages.

Japanese Office Action mailed Mar. 12, 2013, for Japanese Patent Application No. P2009-156031, with English translation, 4 pages.

* cited by examiner

*Primary Examiner* — Hieu T Vo
(74) *Attorney, Agent, or Firm* — Morrison & Foerster LLP

(57) ABSTRACT

During travel of a vehicle, an apparatus acquires vehicle velocity information detected by a vehicle velocity sensor and a reference accelerator opening degree and an estimated gear position from a reference accelerator opening degree table indicative of relationship between vehicle velocities and accelerator opening degrees during travel of the vehicle at cruising velocity. The apparatus also acquires an estimated number of prime mover rotations at the vehicle velocity from a vehicle-velocity vs. number-of-prime-mover-rotation correlation table, and then calculates a difference between the estimated number of prime mover rotations and an actual number of prime mover rotations detected by a number-of-prime-mover-rotation sensor. Further, a value, obtained by multiplying the calculated difference by a compensating coefficient determined in accordance with characteristics specific to the vehicle, is added to the reference accelerator opening degree, to thereby calculate an estimated accelerator opening degree.

13 Claims, 3 Drawing Sheets

122

| REFERENCE ACCELERATOR OPENING DEGREE (0-1) | ··· | A% | ··· | 1/8 (12.5%) | ··· | B% | ··· |
|---|---|---|---|---|---|---|---|
| REFERENCE GEAR POSITION (1-5) | ··· | a | ··· | 3 | ··· | b | ··· |
| | 20 and less ← | 30 | | 40 | | 50 | → 60 and more |

VEHICLE VELOCITY (km/h)

ACCELERATOR OPENING DEGREE ESTIMATION AND ENGINE SOUND GENERATION

BACKGROUND

The present invention relates to an accelerator opening degree estimation apparatus and method, and further relates to an apparatus and method for generating an engine sound on the basis of an estimated accelerator opening degree.

In the field of vehicles, there have been known apparatus which detect operation amounts of an accelerator pedal etc. operated by a human operator or driver and generate an engine sound etc. on the basis of results of the operation detection. Japanese Patent Application Laid-open Publication No. 2006-69487 discloses an apparatus which, in order to generate a pseudo or simulated engine sound corresponding to operating conditions of a low-noise vehicle having an electric motor as its drive source or prime mover, detects a throttle opening degree by means of a throttle opening degree sensor mounted on an engine and an accelerator operation amount by means of an accelerator operation amount source.

Further, Japanese Patent Application Laid-open Publication No. 2005-90347 (corresponding to U.S. Patent Application Publication No. 2005/0056253) discloses an apparatus which detects an accelerator pedal depression amount by means of an accelerator pedal depression amount detection section connected to one end of a pedal shaft having the accelerator pedal pivotably mounted thereon.

However, in some cases, mounting a sensor on a control (or operator), such as an accelerator pedal, is not only difficult but also in appropriate from a viewpoint of operability etc.

SUMMARY OF THE INVENTION

In view of the foregoing, it is an object of the present invention to provide an improved accelerator opening degree estimation apparatus and method which can estimate an accelerator opening degree without a sensor being mounted on a control or operator, such as an accelerator pedal.

It is another object of the present invention to provide an apparatus and method which generates an engine sound on the basis of an estimated accelerator opening degree.

In order to accomplish the above-mentioned objects, the present invention provides an improved accelerator opening degree estimation apparatus, which comprises: a vehicle velocity detection device that detects a velocity of a vehicle; a number-of-prime-mover-rotation detection device that detects a number of rotations of a prime mover of the vehicle; a storage section storing therein relationship between velocities of a vehicle and accelerator opening degrees and number of rotations of the prime mover during travel of the vehicle under a predetermined condition; an acquisition section that acquires, from the storage section, the accelerator opening degree and number of rotations of the prime mover corresponding to the velocity detected by the vehicle velocity detection device; and an accelerator opening degree compensation section that compares the number of rotations acquired by the acquisition section and an actual number of rotations detected by the number-of-prime-mover-rotation detection device and compensates the accelerator opening degree, acquired by the acquisition section, on the basis of a result of the comparison between the number of rotations acquired by the acquisition section and the actual number of rotations, an accelerator opening degree being estimated in accordance with the accelerator opening degree compensated by the accelerator opening degree compensation section.

According to the present invention, relationship between velocities of a vehicle and accelerator opening degrees and number of rotations of the prime mover during travel of the vehicle under a predetermined condition (e.g., during travel at cruising velocity) are prestored in the storage section, and the accelerator opening degree and number of rotations of the prime mover corresponding to the velocity detected by the vehicle velocity detection device are acquired from the storage section. Then, the accelerator opening degree acquire from the storage section is compensated on the basis of the result of the comparison between the number of rotations acquired by the acquisition section and the actual number of rotations detected by the number-of-prime-mover-rotation detection device, so that an accelerator opening degree is estimated with high accuracy. Thus, with the present invention, an appropriate accelerator opening degree can be detected (estimated) without a particular accelerator opening degree detection device being provided on a control, such as an accelerator pedal.

As an embodiment, when the actual number of rotations detected by the number-of-prime-mover-rotation detection device is greater than the number of rotations acquired by the acquisition section, the accelerator opening degree compensation section compensates the accelerator opening degree, acquired by the acquisition section, in such a manner that a value of the acquired accelerator opening degree increase in accordance with a difference between the actual number of rotations and the acquired number of rotations. When the actual number of rotations detected by the number-of-prime-mover-rotation detection device is smaller than the number of rotations acquired by the acquisition section, on the other hand, the accelerator opening degree compensation section compensates the accelerator opening degree, acquired by the acquisition section, in such a manner that the value of the acquired accelerator opening degree decrease in accordance with the difference between the actual number of rotations and the acquired number of rotations.

In order to accomplish the above-mentioned objects, the present invention provides an improved engine sound generation apparatus which comprises the accelerator opening degree estimation apparatus and an engine sound waveform generation device that generates an engine sound waveform on the basis of the estimated accelerator opening degree, i.e. accelerator opening degree compensated by the accelerator opening degree compensation section and the number of rotations detected by the number-of-prime-mover-rotation detection device. A simulated engine sound can be audibly sounded, through a speaker provided in the vehicle, on the basis of the generated engine sound waveform. Thus, the present invention can generate an appropriate engine sound waveform and hence a simulated engine sound on the basis of the appropriately estimated accelerator opening degree, with the result that it is well suited for application to an electric cars and hybrid cars.

The present invention may be constructed and implemented not only as the apparatus invention as discussed above but also as a method invention. Also, the present invention may be arranged and implemented as a software program for execution by a processor such as a computer or DSP, as well as a storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Construction of an Embodiment

Figure 1:
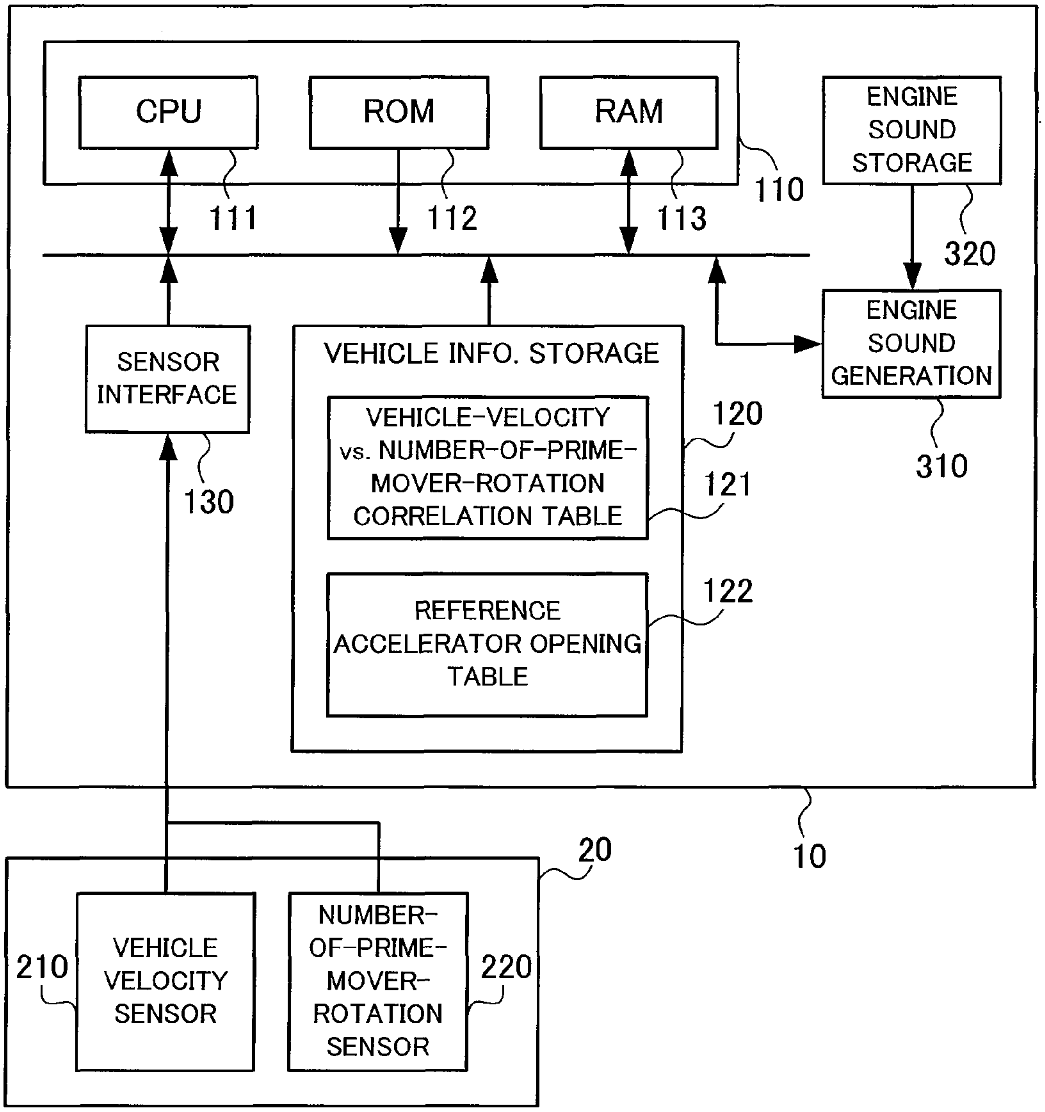
FIG. 1 is a block diagram showing an example general setup of an engine sound generation apparatus according to a first embodiment of the present invention.

FIG. 1 is a block diagram showing an example general construction of an engine sound generation apparatus 10 according to a first embodiment of the present invention. A sensor apparatus 20 shown in FIG. 1 includes a vehicle velocity sensor (vehicle velocity detection device) 210 that detects vehicle velocity information, and a number-of-prime-mover-rotation sensor (number-of-prime-mover-rotation detection device) 220 that detects a number of rotations of a prime mover (hereinafter also referred to as "number of prime mover rotations") of the vehicle. For example, a sensor for detecting a number of rotations of a shaft is used as the vehicle velocity sensor 210, which outputs vehicle traveling velocity information (hereinafter referred to as "vehicle velocity information") indicative of the detected number of rotations of the shaft.

The number-of-prime-mover-rotation sensor 220 detects a number of rotations of a prime mover that is a drive source of the vehicle and outputs number-of-prime-mover-rotation information indicative of the detected number of rotations of the prime mover (also referred to as "prime mover rotations"). The detection of the number of rotations of the prime mover (prime mover rotations) is performed in any known manner, e.g. through measurement based on detection of ignition pulses or measurement based on detection of engine vibration, and a sensor suited such measurement is used as the number-of-prime-mover-rotation sensor 220. The above-mentioned vehicle velocity information and the number-of-prime-mover-rotation information is supplied, via a sensor interface 130, to an accelerator opening degree calculation section 110. Note that the prime mover may be of any suitable construction that comprises only an internal combustion engine, only an electric motor, or a combination of an internal combustion engine and an electric motor (i.e., hybrid type prime mover).

An accelerator opening degree calculation section 110 includes a CPU (Central Processing Unit) 111, a ROM (Read-Only memory) 112 having prestored therein programs etc. for use by the CPU 111, and a RAM (random Access Memory) 113 for use as a working area of the CPU 111. These components 111, 112 and 113 together constitute an ordinary computer.

Figure 2:
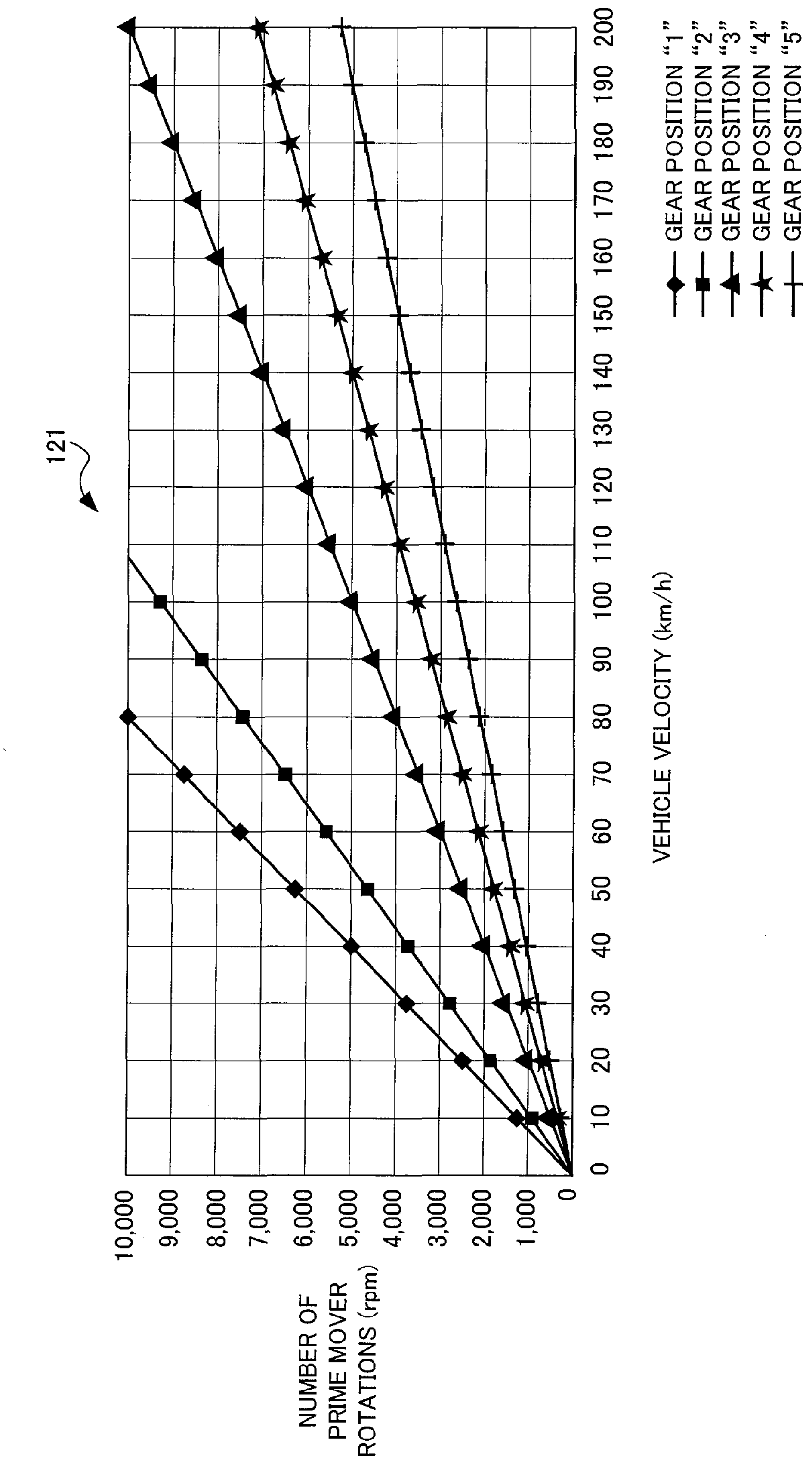
FIG. 2 is a table showing relationship between vehicle velocities and numbers of rotations of a prime mover corresponding to various gear ratios.

A vehicle information storage section 120 has stored therein information indicative of characteristics of the vehicle, such as a table indicative of relationship between vehicle velocities and numbers of rotations of the prime mover. A vehicle-velocity vs. number-of-prime-mover-rotation correlation table 121 shown in FIG. 2 is one of tables prestored in the vehicle information storage section 120, and this table indicates, for each of gear positions of a transmission, relationship between vehicle velocities and numbers of prime mover rotations of the vehicle. The vehicle-velocity vs. number-of-prime-mover-rotation correlation table 121 indicates, for each of the gear positions, relationship between vehicle velocities and numbers of prime mover rotations of the vehicle traveling at cruising velocity. A reference accelerator opening degree table 122 indicating corresponding relationship between partial accelerator opening degrees and gear positions to achieve the individual cruising velocities is provided in the vehicle information storage section 120 in association with the vehicle-velocity vs. number-of-prime-mover-rotation correlation table 121.

Figures 3, 4:
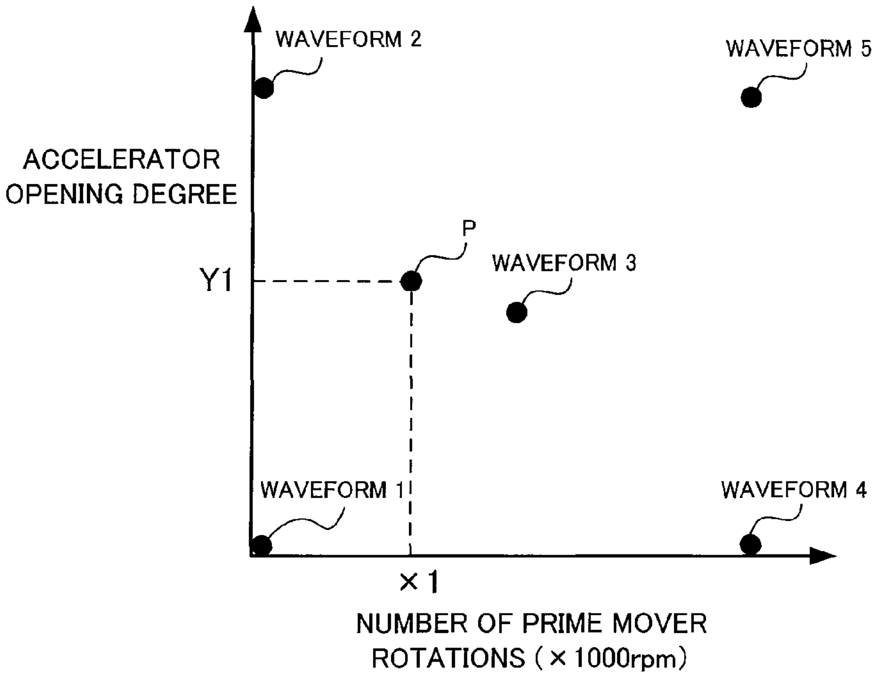
FIG. 3 is an example of a reference accelerator opening degree table showing relationship between reference accelerator opening degrees and estimated numbers of rotations of the prime mover corresponding to vehicle velocities.
FIG. 4 is a diagram showing relationship between waveform of five kinds of engine sounds and numbers of rotations of the prime mover and accelerator opening degrees.

One example of the above-mentioned reference accelerator opening degree table 122 is shown in FIG. 3. For example, in the reference accelerator opening degree table 122, a particular gear position is preset for one of predetermined vehicle velocity ranges from a low velocity to a high velocity, reference accelerator opening degrees are preset as partial accelerator opening degrees corresponding to the vehicle velocity ranges and preset gear positions (hereinafter referred to as "reference gear positions"). In the reference accelerator opening degree table 122 of FIG. 3, the reference gear position is set at "3" and the accelerator opening degree is set at "12.5%" when the vehicle velocity is 40 km/h. Similarly, the reference gear position is set at "a" and the accelerator opening degree is set at "A %" when the vehicle velocity is 30 km/h. Namely, as used herein, the reference accelerator opening degree (e.g., A %) indicates an accelerator opening degree to allow the vehicle to travel keeping a predetermined velocity (e.g., 30 km/h) at a predetermined gear position (e.g., a) when the vehicle is actually caused to travel under predetermined conditions. In this case, the reference gear position may be set, for each individual vehicle velocity, either at any one of gear positions normally selected by ordinary or conventional automatic transmissions, or at any one of desired gear positions with a velocity region of gear position "3" widened as compared to that in the ordinary or conventional automatic transmissions. Further, for a vehicle provided with a continuously variable transmission (CVT), a table may be created by associating accelerator opening degrees with corresponding relationship between vehicle velocities and gear ratios of the continuously variable transmission. In this case, five reference gear ratios are used in place of the five reference gear positions shown in FIGS. 2 and 3. Note that, if no transmission gear mechanism intervenes as in a case where four wheels are driven by separate electric motors, no consideration need be made of a factor of the gear position or gear ratio in the tables 121 and 122.

An engine sound storage section 320 has prestored therein data obtained by sampling engine sounds, and an engine sound generation section 310 generates simulated engine sounds by use of the sampling data prestored in the engine sound storage section 320.

In the instant embodiment, five kinds of the sampling data are prestored in the engine sound storage section 320. FIG. 4 shows what kinds of situations these sampling data correspond to. Namely, waveforms 1-5, corresponding to the five kinds of the sampling data, are each a waveform under a situation determined by the accelerator opening degree represented on the vertical axis of FIG. 4 and the number of prime mover rotations represented on the horizontal axis of FIG. 4. For example, waveform 1 is a waveform of an engine sound generated when the prime mover is idling with the accelerator closed, and waveform 5 is a waveform of an engine sound generated when the prime mover is rotating at a maximum speed with the accelerator fully opened. The other waveforms too are each a waveform of a sound generated at an accelerator opening degree and number of prime mover rotations indicated by respective coordinates.

Behavior of the Embodiment

The following describe a process performed by the instant embodiment to estimating an accelerator opening degree, with reference to FIG. 1. Once the vehicle is activated, the vehicle velocity sensor 210 detects vehicle velocity information, and the number-of-prime-mover-rotation sensor 220 detects number-of-prime-mover-rotation information. The thus-detected vehicle velocity information and number-of-prime-mover-rotation information is input to the accelerator opening degree calculation section 110 via the sensor interface 130.

Thus, the accelerator opening degree calculation section 110 references the reference accelerator opening degree table 122, stored in the vehicle information storage section 120, to acquire one reference accelerator opening degree and one reference gear position corresponding to the detected vehicle velocity. Then, the accelerator opening degree calculation section 110 references the vehicle-velocity vs. number-of-prime-mover-rotation correlation table 121, stored in the vehicle information storage section 120, to acquire an estimated number of prime mover rotations corresponding to the detected vehicle velocity and the reference gear position acquired from the reference accelerator opening degree table 122.

Because the reference accelerator opening degree and the estimated number of prime mover rotations assume that the vehicle is in the cruising travel state i.e., traveling at cruising velocity), they would differ from an actual accelerator opening degree and actual number of prime mover rotations, due to a change in traveling condition, such as when the vehicle is in an accelerating or decelerating state or in a half-clutch state. Therefore, in the instant embodiment, a difference between an actual number of prime mover rotations detected by the number-of-prime-mover-rotation sensor 220 and the estimated number of prime mover rotations is calculated so as to compensate the reference accelerator opening degree using the thus-calculated difference value.

More specifically, the calculated difference value is multiplied by a corresponding one of values predetermined for individual vehicles or individual vehicle types; such a predetermined value will hereinafter be referred to as "compensating coefficient". The difference value thus multiplied by the compensating coefficient is then added to the reference accelerator opening degree so as to calculate a compensated accelerator opening degree, and the compensated accelerator opening degree is set as an estimated value of the accelerator opening degree (hereinafter referred to as "estimated accelerator opening degree value"). The compensating coefficient is a numerical value for calculating such an estimated accelerator opening degree value, and it is determined by performing measurement for each of various vehicles or vehicle types. The compensating coefficients predetermined for the individual vehicles or vehicle types may be preset in a program prestored in the ROM 112 for use by the CPU 111 or stored in the RAM 113 or vehicle information storage section 120, so that the CPU 111 can reference the compensating coefficients as necessary. Note that the compensating coefficient may be increased or decreased on the basis of numerical values obtained by detecting states of the traveling vehicle by means of a tire air pressure sensor, acceleration sensor, etc.

The following describe a specific example of an accelerator opening degree estimation process performed in the instant embodiment. Let it be assumed here that the compensating coefficient is "0.02". If the detected number of prime mover rotations is 3,700 rpm when the vehicle is traveling at a velocity of 40 km per hour, reference gear position "3" corresponding to the velocity of 40 km per hour is obtained or acquired on the basis of the reference accelerator opening degree table 122, and number of prime mover rotations "2,000 rpm" corresponding to the 40 km/h vehicle velocity and reference gear position "3" is obtained or acquired as the estimated number of prime mover rotations on the basis of the vehicle-velocity vs. number-of-prime-mover-rotation correlation table 121. Then, a difference between the detected number of prime mover rotations and the estimated number of prime mover rotations is calculated, and the thus-calculated difference is multiplied by the corresponding compensating coefficient and added to the reference accelerator opening degree so as to obtain an estimated accelerator opening degree value; namely, in this case, the estimated accelerator opening degree value is calculated as "12.5+(3,700−2,000)×0.02=46.5(%)".

In the foregoing example, the detected actual number of prime mover rotations is greater than the number of prime mover rotations prestored for the vehicle velocity kept at 40 km per hour. In this example, the accelerator opening angle is compensated to increase because it is estimated that the prime mover is rotating at an increased rate to accelerating the vehicle.

Let's assume another example where the detected number of prime mover rotations is 1,600 rpm. In this case, the estimated accelerator opening degree value is calculated as "12.5%+(1,600−2,000)×0.02=4.5(%)". In this case, it is estimated that the vehicle is decelerating, and thus, the accelerator opening degree is compensated to decrease.

As seen from the above, an accelerator opening degree at any given vehicle velocity can be estimated by compensating a reference accelerator opening degree using a difference value between an actual number of prime mover rotations detected by the number-of-prime-mover-rotation sensor 220 and an estimated number of prime mover rotations.

[Generation of Engine Sound]

The following describe a process performed by the engine sound generation section 310 for generating a simulated engine sound. The estimated accelerator opening degree value calculated by the accelerator opening degree calculation section 110 and the number of prime mover rotations detected by the number-of-prime-mover-rotation sensor 220 are input to the engine sound generation section 310. On the basis of the estimated accelerator opening degree value and number of prime mover rotations, the engine sound generation section 310 generates an engine sound waveform by synthesizing, as appropriate, any of the five kinds of sampling data prestored in the engine sound storage section 320.

For example, in a case where the number of prime mover rotations is X1 and the estimated accelerator opening degree value is Y1, waveforms of three engine sounds (in this case, waveforms 1-3) close to a coordinate point P corresponding to these conditions are selected as objects of synthesis, as shown in FIG. 4. At that time, individual sampling data are weighted according distances between the coordinate point P and three coordinates indicative of waveforms 1-3. Then, the weighted three sampling data are synthesized to generate an engine sound waveform that corresponds to the conditions represented at the coordinate point P. Whereas the waveforms of the three engine sounds close to the coordinates indicated by the number of prime mover rotations and estimated accelerator opening degree value are selected in the above case, the number of the engine sound waveforms may be any desired predetermined number rather than being limited to three.

Next, the waveform of the simulated engine sound generated by the engine sound generation section 310 is amplified by an amplifier (not shown) and then output to an external speaker or the like so that it is audibly sounded.

Whereas the instant embodiment has been described as using five kinds of sampling data, six or more kinds of sampling data may be used.

[Modification 1]

Whereas the above-described embodiment is constructed to compensate a reference accelerator opening degree by use of a difference value between an actual number of prime mover rotations detected by the number-of-prime-mover-rotation sensor 220 and an estimated number of prime mover rotations, the reference accelerator opening degree compensation may be made using a ratio, rather than a difference, between the actual number of prime mover rotations and the estimated number of prime mover rotations. In short, it suffices for the reference accelerator opening degree compensation to be made on the basis of a comparison between the actual number of prime mover rotations detected by the number-of-prime-mover-rotation sensor 220 and the estimated number of prime mover rotations.

[Modification 2]

Whereas the above-described embodiment is constructed to use an estimated accelerator opening degree to generate a simulated engine sound, the use of the estimated accelerator opening degree is not limited to the generation of a simulated engine sound. For example, an image corresponding to an accelerator opening degree may be displayed on a display device on the basis of the estimated accelerator opening degree, to inform the human driver of the accelerator opening degree. Also, one or more other devices, such as an illumination devices, air conditioner and fan, may be controlled on the basis of information of the accelerator opening degree.

[Modification 3]

Whereas the above-described embodiment is constructed to synthesize prestored waveform data after weighting the waveform data and then generate an engine sound waveform on the basis of the thus-synthesized waveform data, the engine sound waveform generation may be performed in any other suitable manner. For example, the engine sound waveform generation may be performed using a sine wave synthesis scheme, and various envelope control and modulation control may be performed on the waveform generated using the sine wave synthesis scheme. Also, at the time of waveform readout, read addresses therefor may be modulated. In short, it suffices to change the ways of the waveform synthesis and modulation in correspondence with the estimated accelerator opening degree so that the waveform of the engine sound varies.

[Modification 4]

Whereas the above-described embodiment is constructed to estimate an accelerator opening degree on the basis of relationship between a vehicle velocity and number of prime mover rotations when the vehicle is traveling at cruising velocity (i.e., traveling on a flat ground surface at constant velocity) and corresponding relationship between partial accelerator opening degrees for achieving various cruising velocities and gear positions, an accelerator opening degree may be estimated on the basis of corresponding relationship between values of these factors measured with an inclination of a road surface, frictional state between the road surface and the tire, air resistance, etc. kept constant.

The present application is based on, and claims priority to, Japanese Patent Application No. 2009-156031 filed on Jun. 30, 2009. The disclosure of the priority application, in its entirety, including the drawings, claims, and the specification thereof, is incorporated herein by reference.

What is claimed is:

1. An accelerator opening degree estimation apparatus comprising:

a vehicle velocity detection device that detects a velocity of a vehicle;

a number-of-prime-mover-rotation detection device that detects a number of rotations of a prime mover of the vehicle;

a storage section storing therein relationship between velocities of a vehicle and accelerator opening degrees and number of prime mover rotations during travel of the vehicle under a predetermined condition;

an acquisition section that acquires, from said storage section, the accelerator opening degree and number of prime mover rotations corresponding to the velocity detected by said vehicle velocity detection device; and an accelerator opening degree compensation section that compares the number of rotations acquired by said acquisition section and an actual number of rotations detected by said number-of-prime-mover-rotation detection device and compensates the accelerator opening degree, acquired by said acquisition section, on the basis of a result of the comparison between the number of rotations acquired by said acquisition section and the actual number of rotations, an accelerator opening degree being estimated in accordance with the accelerator opening degree compensated by said accelerator opening degree compensation section.

2. The accelerator opening degree estimation apparatus as claimed in claim 1, wherein said accelerator opening degree compensation section compensates the accelerator opening degree, acquired by said acquisition section, on the basis of a difference between the actual number of rotations detected by said number-of-prime-mover-rotation detection device and the number of rotations acquired by said acquisition section.

3. The accelerator opening degree estimation apparatus as claimed in claim 2, wherein, when the actual number of rotations detected by said number-of-prime-mover-rotation detection device is greater than the number of rotations acquired by said acquisition section, said accelerator opening degree compensation section compensates the accelerator opening degree, acquired by said acquisition section, in such a manner that a value of the acquired accelerator opening degree increase in accordance with a difference between the actual number of rotations and the acquired number of rotations, and wherein, when the actual number of rotations detected by said number-of-prime-mover-rotation detection device is smaller than the number of rotations acquired by said acquisition section, said accelerator opening degree compensation section compensates the accelerator opening degree, acquired by said acquisition section, in such a manner that the value of the acquired accelerator opening degree decrease in accordance with the difference between the actual number of rotations and the acquired number of rotations.

4. The accelerator opening degree estimation apparatus as claimed in claim 1, wherein said accelerator opening degree compensation section compensates the accelerator opening degree, acquired by said acquisition section, on the basis of a ratio between the actual number of rotations detected by said number-of-prime-mover-rotation detection device and the number of rotations acquired by said acquisition section.

5. The accelerator opening degree estimation apparatus as claimed in claim 1, wherein said accelerator opening degree compensation section compensates the accelerator opening degree using a compensating coefficient specific to the vehicle.

6. The accelerator opening degree estimation apparatus as claimed in claim 1, wherein said storage section includes a first table defining relationship between velocities of the vehicle and a plurality of reference accelerator opening degrees and a plurality of reference gear positions, and a second table defining, for each of the reference gear positions, relationship between velocities of the vehicle and number of rotations of the prime mover, and wherein said acquisition section acquires, from said first table, information of a reference accelerator opening degree and reference gear position in correspondence with the velocity of the vehicle detected by said vehicle velocity detection device and acquires, from said second table, a number of rotations of the prime mover in correspondence with the acquired information of the reference gear position and the velocity of the vehicle detected by said vehicle velocity detection device.

7. The accelerator opening degree estimation apparatus as claimed in claim 1, wherein said storage section includes a first table defining relationship between velocities of the vehicle and a plurality of reference accelerator opening degrees and a plurality of reference gear ratios, and a second table defining, for each of the reference gear ratios, relationship between velocities of the vehicle and number of rotations of the prime mover, and wherein said acquisition section acquires, from said first table, information of a reference accelerator opening degree and reference gear ratio in correspondence with the velocity of the vehicle detected by said vehicle velocity detection device and acquires, from said second table, a number of rotations of the prime mover in correspondence with the acquired information of the reference gear ratio and the velocity of the vehicle detected by said vehicle velocity detection device.

8. The accelerator opening degree estimation apparatus as claimed in claim 1, wherein the travel under the predetermined condition is travel at cruising velocity.

9. An engine sound generation apparatus comprising:

the accelerator opening degree estimation apparatus as claimed in claim 1; and an engine sound waveform generation device that generates an engine sound waveform on the basis of the accelerator opening degree compensated by said accelerator opening degree compensation section and the number of rotations detected by said number-of-prime-mover-rotation detection device.

10. A computer-implemented method for estimating an accelerator opening degree, said method comprising:

a step of detecting a velocity of a vehicle by a vehicle velocity sensor;

a step of detecting a number of rotations of a prime mover of the vehicle by a number-of-prime-mover-rotation sensor;

a step of acquiring, by reference to a storage section, an accelerator opening degree and number of rotations of the prime mover corresponding to the velocity detected by the vehicle velocity sensor, the storage section storing therein relationship between velocities of a vehicle and accelerator opening degrees and number of rotations of the prime mover during travel of the vehicle under a predetermined condition;

a compensation step of comparing the number of rotations acquired by said step of acquiring and an actual number of rotations detected by the number-of-prime-mover-rotation sensor and then compensating the accelerator opening degree, acquired by said step of acquiring, on the basis of a result of the comparison between the number of rotations acquired by said step of acquiring and the actual number of rotations, an accelerator opening degree being estimated in accordance with the accelerator opening degree compensated by said compensation step.

11. The computer-implemented method as claimed in claim 10, which further comprises a step of generating an engine sound waveform on the basis of the accelerator opening degree compensated by said compensation step and the number of rotations detected by the number-of-prime-mover-rotation sensor.

12. A computer-readable storage medium containing a program for causing a computer to perform a procedure for estimating an accelerator opening degree, said procedure comprising:

a step of detecting a velocity of a vehicle by a vehicle velocity sensor;

a step of detecting a number of rotations of a prime mover of the vehicle by a number-of-prime-mover-rotation sensor;

a step of acquiring, by reference to a storage section, an accelerator opening degree and number of rotations of the prime mover corresponding to the velocity detected by the vehicle velocity sensor, the storage section storing therein relationship between velocities of a vehicle and accelerator opening degrees and number of rotations of the prime mover during travel of the vehicle under a predetermined condition;

a compensation step of comparing the number of rotations acquired by said step of acquiring and an actual number of rotations detected by the number-of-prime-mover-rotation sensor and then compensating the accelerator opening degree, acquired by said step of acquiring, on the basis of a result of the comparison between the number of rotations acquired by said step of acquiring and the actual number of rotations, an accelerator opening degree being estimated in accordance with the accelerator opening degree compensated by said compensation step.

13. The computer-readable storage medium as claimed in claim 12, wherein said procedure further comprises a step of generating an engine sound waveform on the basis of the accelerator opening degree compensated by said compensation step and the number of rotations detected by the number-of-prime-mover-rotation sensor.

* * * * *